United States Patent [19]

Masciangelo et al.

[11] Patent Number: 5,812,395
[45] Date of Patent: Sep. 22, 1998

[54] VISION BASED FORKLIFT CONTROL SYSTEM FOR AUTONOMOUS PALLET LOADING

[76] Inventors: Stefano Masciangelo, Via Donaver 20/25, Genoa; Marco Ilic, Via Secchi, Reggio Emilia, both of Italy

[21] Appl. No.: 556,023

[22] Filed: Nov. 13, 1995

[30] Foreign Application Priority Data

Nov. 16, 1994 [IT] Italy .......................... MI.94-A/002321

[51] Int. Cl.⁶ .............................. G06K 9/36; G05B 19/18; B66F 9/06
[52] U.S. Cl. .................... 364/167.02; 364/559; 382/172; 382/291; 356/138; 356/152.2; 187/222
[58] Field of Search ........... 364/167.01, 424.01–424.07; 395/89; 87/222, 224, 227; 382/100, 141, 142, 153, 291, 171, 172, 168; 356/138, 152.2; 187/222

[56] References Cited

U.S. PATENT DOCUMENTS

| | | | |
|---|---|---|---|
| 4,279,328 | 7/1981 | Ahlbom | 187/224 |
| 4,678,329 | 7/1987 | Lukowski, Jr. et al. | 356/152.2 |
| 4,684,247 | 8/1987 | Hammill, III | 356/152.2 |
| 4,707,647 | 11/1987 | Coldren et al. | 382/151 |
| 4,887,016 | 12/1989 | Malick | 395/89 |
| 5,208,753 | 5/1993 | Acuff | 364/424.07 |
| 5,208,758 | 5/1993 | Acuff . | |
| 5,350,269 | 9/1994 | Azuma et al. | 414/416 |
| 5,459,636 | 10/1995 | Gee et al. | 364/516 |

FOREIGN PATENT DOCUMENTS

| | | |
|---|---|---|
| 0152594 | 8/1985 | European Pat. Off. . |
| 8702484 | 4/1987 | WIPO . |

OTHER PUBLICATIONS

Benjamin M. Dawson, "Introduction to Image Processing Algorithms: An overview of the basics, with code to get you started", BYTE, pp. 169–186, Mar. 1987.
European Search Report, The Hague, Jun. 18, 1996, Examiner Hauser, L.
Patent Abstracts of Japan, vol. 17, No. 620, Nov. 16, 1993.

*Primary Examiner*—Emanuel Todd Voeltz
*Assistant Examiner*—Demetra R. Smith
*Attorney, Agent, or Firm*—Hedman, Gibson & Costigan, P.C.

[57] ABSTRACT

An forklift system which provides for autonomous pallet loading through the use of a telecamera rigidly connected to a pair of fork prongs located on the forklift, wherein the telecamera is connected to an image acquisition and processing apparatus and a computer which controls and moves the pair of fork prongs. The movement of the fork prongs is based upon the input received into the computer in the form of a processed image from the image processing apparatus. The image processing apparatus creates a digital image which enables the computer to estimate the position and orientation of the framed pallet relative to the telecamera.

3 Claims, 4 Drawing Sheets

VISION BASED FORKLIFT CONTROL SYSTEM FOR AUTONOMOUS PALLET LOADING

BACKGROUND OF THE INVENTION

This invention relates to a vision based forklift control system for autonomous pallet loading.

In particular, this automatic control and guide system is a system for identifying the position of a pallet, with consequent control of the fork prongs of the forklift for the purpose of moving said pallet and the goods supported on it.

A pallet is a support made of any material, normally wood, on which packaged goods are supported and which is used for goods storage and transport. The pallet shape is a parallelepiped with a rectangular base and a height of the order of ten centimeters. The lateral profile of a pallet comprises two cavities symmetrical about the central axis of said profile to the right and to the left of the central vertical line through said rectangular profile respectively. All the characteristic pallet dimensions are standardized, the pallet model hence being standard.

In moving pallet-supported goods within a store, lifts or trucks provided with a pair of fork prongs are normally used. If the pallet with its goods is in a high position, it is not always easy to fork the pallet, in that the operator has to guide the fork prongs and fork the pallet without direct vision.

SUMMARY OF THE INVENTION

The main object of the invention is to automate the overall pallet forking and movement procedure.

A further object of the invention is to configure a system by which pallets can be reliably framed and forked automatically, so overcoming the aforesaid problems of the state of the art. Such a system must provide reliable and effective forking of pallets even when these are arranged in a considerably disordered manner, this disorder relating both to the horizontal and to the vertical location of the pallets. A further object is to make such forking operation possible even when the operator working from the ground has poor or very poor visibility.

These objects are attained according to the present invention by a system for automatically controlling and guiding a pair of fork prongs for pallets, comprising a telecamera rigid with the pair of fork prongs, an image acquisition apparatus, a computer and means for controlling and moving said pair of fork prongs on the basis of signals originating from said computer, wherein starting with the framing of a pallet by said telecamera, acquired by said image acquisition apparatus as a digital image, the computer estimates the position and orientation of the framed pallet relative to the telecamera.

Said system implements an effective and advantageous procedure for estimating the position and orientation of the telecamera-framed pallet relative to the telecamera itself, which procedure, following acquisition and memorization of the geometrical information defining the pallet model by said computer, comprises the following steps:

a) acquisition of the estimated position and orientation of the pallet either by other sensors or by prior knowledge, so as to identify a region in which with high probability the pallet to be framed, defined by two cavities, is positioned;

b) on the basis of said prior estimate, framing by the telecamera of that region in which one of the sides of the pallet is assumed to be present;

c) transforming the image obtained by the telecamera into a digitized image in pixels, each pixel being assigned a grey value between the extreme values white and black;

d) determining within the image, and separately one from the other, two separate connected "dark" grey regions corresponding to the cavities which define the pallet;

e) estimating the position of the two centres of the two "dark" grey regions corresponding to the centres of the cavities of the previously known pallet model;

f) performing a perspective inversion on said model with respect to the optical centre of the telecamera and computing with the data of said perspective inversion the position and orientation of the pallet relative to said telecamera.

Starting with said information, ie the position and orientation of the pallet relative to the telecamera, it is hence possible to obtain the position of the two cavities into which the two fork prongs have to be inserted. Using these data, the computer can direct the fork prongs to move towards said two cavities, so achieving perfect forking of the pallet.

Extremely advantageously, starting with the image transformed into a pixel image, the two separate connected grey regions are determined by the following steps, which are implemented twice independently, once to seek the left cavity and once to seek the right cavity:

g) estimating the positions of the centre of the pallet cavities starting with the previous estimate of the pallet position and orientation;

h) seeking the point of darkest grey, known as the kernel point, within a rectangle of determined dimensions centered on said two centres;

i) by means of an iterative growing procedure about said kernel points, constructing a connected region in which the pixels have a grey level less than a predetermined value;

j) iterating the growing procedure, each time increasing the threshold grey value by a given fixed quantity and verifying at each growing iteration that the degree of rectangularity of the determined region has not decreased, where said degree of rectangularity is expressed as the ratio of the area of the connected grey region to the area of the rectangle which contains it (circumscribed);

l) at each iteration, further verifying that the dimensions of the region do not exceed the maximum dimensions determined on the basis of the previous estimate of the pallet position and orientation and the telecamera calibration;

m) if at least one of the verifications j) and l) fails, then annulling the last iteration, restoring the preceding region and updating, by reduction, the increase in the threshold grey level for subsequent iterations of the growing procedure; repeating the procedure starting with point i), considering as kernel points all those at the edge of the restored region;

n) halting the growing routine at the moment in which the increase in the threshold grey level cannot be further decreased without becoming equal to zero.

Further advantages and characteristics of the present invention will be more apparent from the description given hereinafter based on the accompanying drawings. The description is provided as non-limiting example of the subject of the invention, and is to be understood as referring to the invention as overall indicated and expressed in this description and in the accompanying claims.

DESCRIPTION OF THE PREFERRED EMBODIMENTS

The system requires as input a rough estimate of the position and orientation in which the pallet to be moved may be lying. This information will be known as the fictitious pallet position. Starting with this information, the system moves the telecamera (for example of black/white CCD type) mounted rigid with the fork prongs in such a manner as to be able to frame the region of maximum probability of encountering a pallet, and via the acquisition apparatus obtains a digitized image in pixels. In conventional manner there is associated with each pixel a value representing grey level using a number for example between 255 and 0, where the value 255 corresponds to white (maximum grey level) and the value 0 corresponds to black (minimum grey level).

At this point the system seeks within this digitized image two mutually separate regions, each of them connected and characterised by a sufficiently dark grey level. The two pallet cavities, namely right and left, ie the two regions into which the forklift prongs are to be inserted, should correspond to these dark regions. Generally, when observed frontally, the cavities are in shadow relative to their edges, because the overlying load does not allow light to illuminate the cavities.

Figure 1:
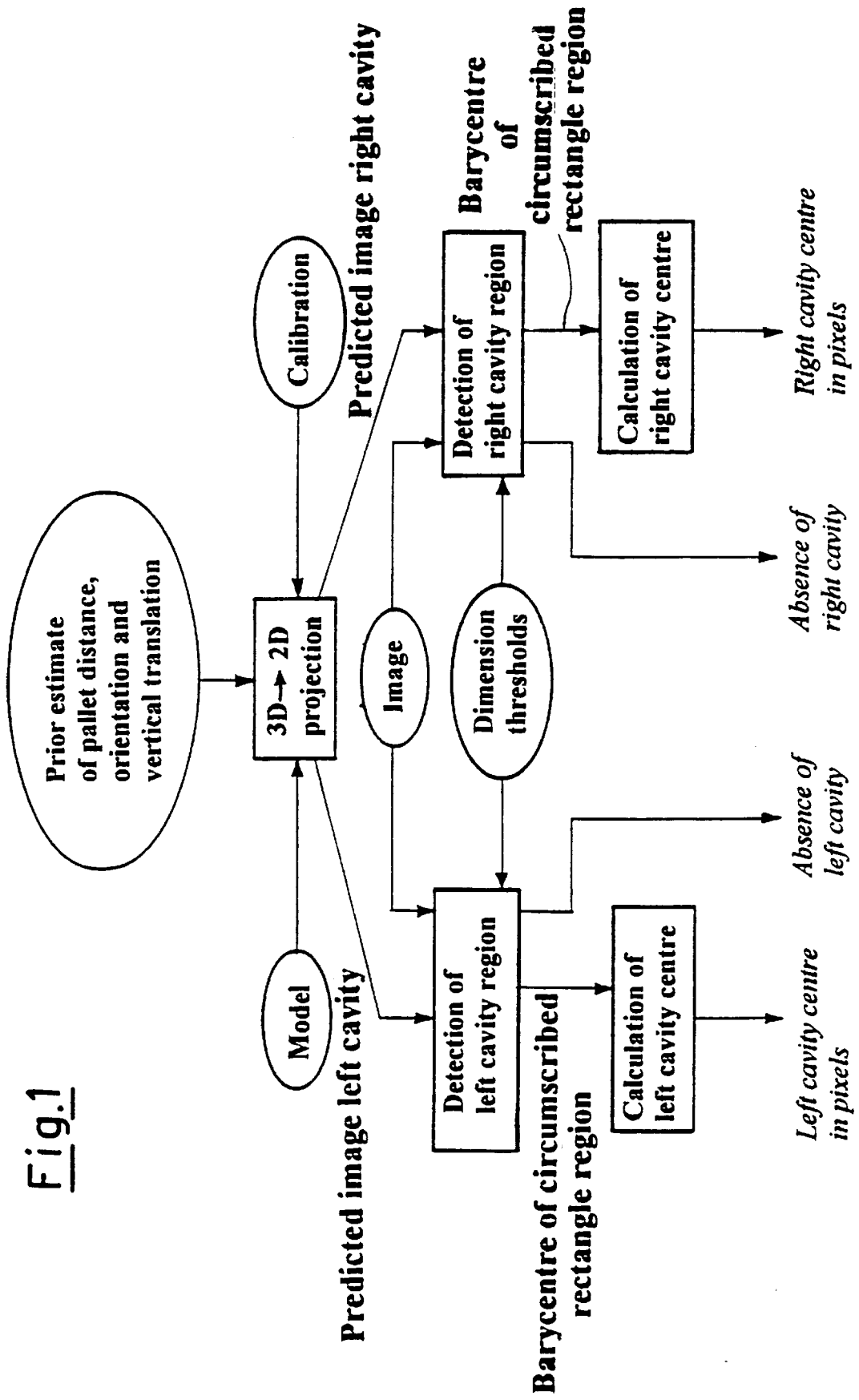
FIG. 1 represents a block diagram of the first part of the procedure for identifying and estimating the pallet position and orientation of the present invention.
Figure 2:
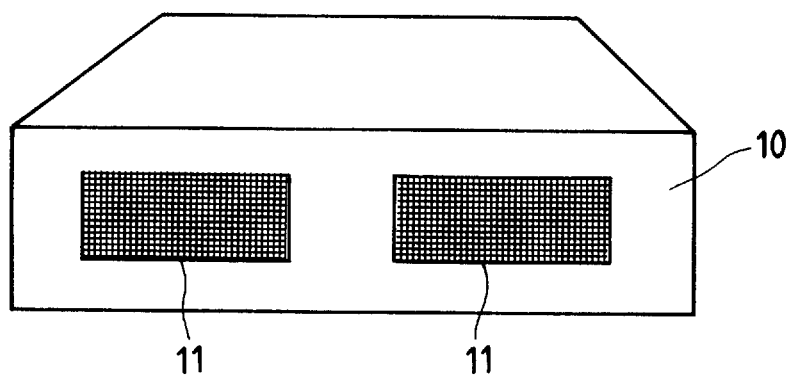
FIG. 2 represents the pallet geometrical model used by the procedure of the present invention.
Figure 3:
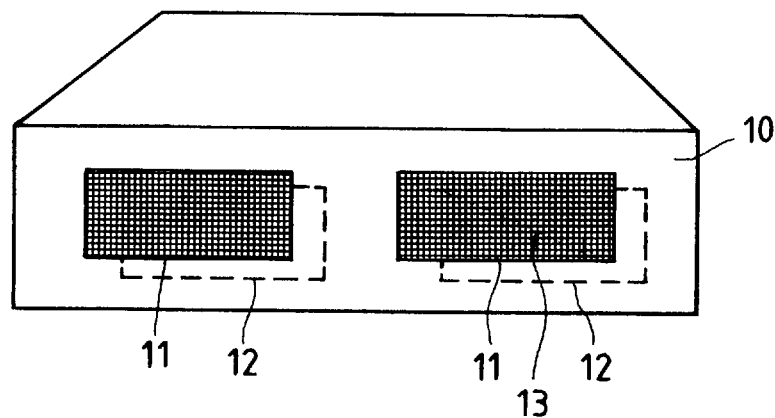
FIG. 3 represents a step in the procedure for identifying and estimating the pallet position and orientation of the present invention.
Figure 4:
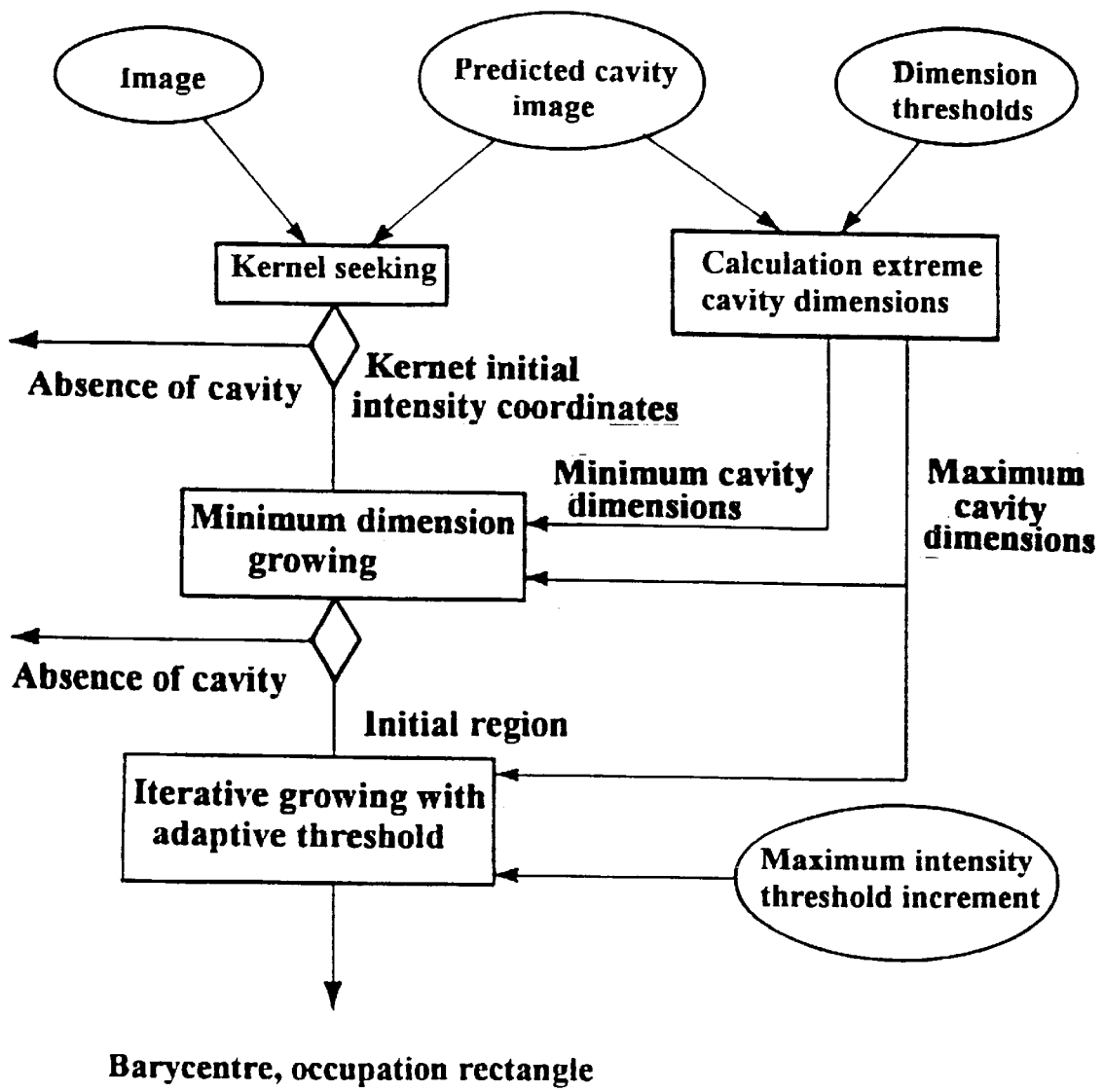
FIG. 4 represents the growing routine on the connected grey region for pallet cavity detection according to the present invention.

For this purpose the pallet model shown in FIG. 2 is used, in which the reference numeral 10 indicates the wooden structure and 11 indicates the two darkly appearing cavities into which the forklift prongs are inserted. FIG. 3 illustrates the framing by the telecamera, showing the pallet as it appears. In the figure, the dashed lines represent the fictitious contours of the fictitious pallet cavities 12, obtained by projecting the theoretical pallet model memorized by the system in the fictitious position obtained as heretofore described. The centres of the two fictitious cavities 12 are indicated in FIG. 3 by the reference numeral 13. Having established the fictitious cavities, this procedure also fixes the presumed minimum and maximum dimensions of the cavities, measured along the horizontal axis and vertical axis of the image.

The image of FIG. 3 is digitized into pixels, assigning to each pixel a grey value corresponding to its light intensity. According to the procedure of the present invention, a window positioned on the centre of said fictitious cavities is scanned to identify that pixel having the darkest grey level. This pixel is known as the kernel.

Having obtained by this search procedure a kernel presumably pertaining to a cavity, an iterative routine is used to construct according to the present invention a connected dark region around said kernel, starting with its grey level as the initial threshold. At each step, the current region is increased by all the points 4-connected to the edge pixels of the region which have a grey value less than said grey threshold (ie a darker grey than the grey level defined by said threshold) and bounding at least one point added at the previous step. The term "pixels 4-connected to a generic point" means the points adjacent to said point to the north, south, east and west. The routine is iterated for increasing threshold values. Each step ends when no pixel connected to the boundary pixels of the current region has a grey value less than the threshold value.

At this point an error signal may occur ("absence of cavity") should the routine have ended without encountering a connected region of dimensions at least equal to the minimum dimensions and less than the maximum dimensions already given. The minimum dimensions are a percentage of the dimensions of the already calculated fictitious cavity. In this respect, an insufficiently large grey region could accidentally exist within the region framed by the telecamera, and hence not be the image of a cavity. To prevent confusion by the system, according to the present invention the connected dark region which it seeks must extend at least as far as the edge of the region defined by said minimum dimensions.

If however the system recognizes a connected dark region of sufficiently large dimensions (FIG. 5), the iterative growing procedure continues, to add a larger pixel region, the grey value of which is less than a new threshold grey value slightly greater than that of the previous step.

At each iteration step, from this moment on, the system carries out a so-called check on the degree of rectangularity of the recognized dark region. This degree of rectangularity is expressed as the ratio of the area of the connected grey region obtained at the last iteration step to the area of the rectangle which circumscribes it. The closer this ratio is to one, the more the grey region has an almost rectangular shape. As the pallet cavities are rectangular in shape, the system seeks according to the present invention to recognize dark regions as close as possible to rectangular in shape.

For this purpose, the highest degree of rectangularity obtained in the preceding iterations is considered, If at a certain step in the iteration the degree of rectangularity of the recognized region is less than said previously obtained degree, the system updates the grey threshold by increasing its value by a given quantity (enabling pixels of a lighter grey to be added). At this point the system proceeds by repeating the last iteration of the growing procedure using the new grey threshold.

This iterative growing procedure terminates before the current region exceeds the dimensions (height, length, area) of the region defined by the maximum supposable cavity dimensions, already obtained as described during the last iteration. If the current region exceeds these limits, the system decreases the grey threshold value so as to compress the connected region, so that it lies within the aforesaid dimensional limits.

Figure 5:
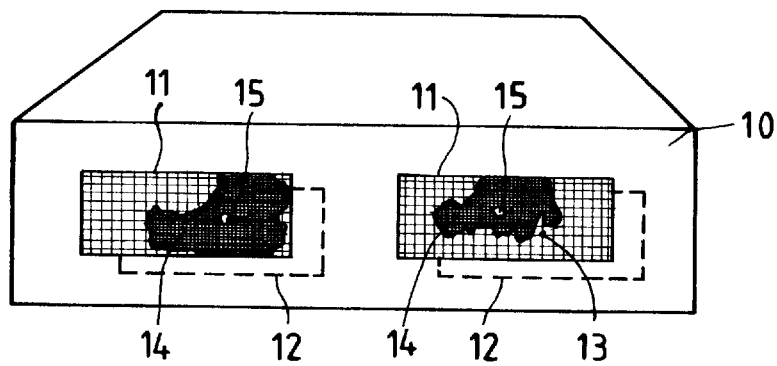
FIG. 5 represents the result of the first step of the growing routine already described in FIG. 4.
Figure 6:
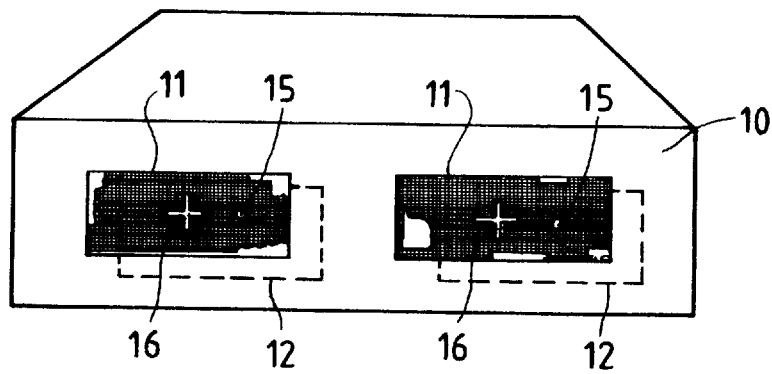
FIG. 6 represents the result of the second step of the growing routine already described in FIG. 4.

The situation reached at this point of the procedure is shown in FIG. 6, in which the reference numeral 10 indicates the pallet structure of wood or other material, 11 defines the two real cavities and 12 defines the two fictitious cavities. Within the fictitious cavities 12 the reference numeral 13 indicates the centre of said cavities. The reference numeral 15 indicates the two kernels found independently of each other by the procedure of the present invention within the region defined by the two fictitious cavities 12. By means of the aforedescribed growing procedure, a respective connected dark grey region, indicated by 14 in FIG. 5, is obtained about each of said two kernels 15.

Following the identification of the two connected grey regions, according to the present invention the system proceeds to identify the two centres of the two regions. The respective centre of each of the two regions is defined as the barycentric point of said region.

In FIG. 6 these centres are indicated by the reference numeral 16 as white crosses on a black background.

Having constructed the positions of the two centres 16 and using the memorized pallet model, the system according to the present invention is able to use said information to calculate the position and orientation of the pallet relative to said telecamera. This calculation is made by perspective inversion of the pallet model located centred on the two centres 16 of its two cavities.

At this point the system, by following all the steps of the present invention, has available all the information necessary for it to effectively and reliably guide the fork prongs so that they become inserted into the pallet cavities. In this respect it knows relative to itself, with excellent approximation, the position and orientation of the pallet and the two cavities into which to insert the pair of fork prongs.

The system can advantageously be made to interact with an operator, who can intervene by modifying the working parameters or by guiding the system if an error signal arises.

We claim:

1. A procedure for estimating the position and orientation of a telecamera-framed pallet relative to the telecamera of a vision based forklift control system for autonomous pallet loading comprising a telecamera rigidly connected to a pair of fork prongs located on the forklift, an image acquisition and processing apparatus, a computer means for controlling and moving said pair of fork prongs on the basis of signals originating from said computer, wherein said signals begin with the framing of a pallet by said telecamera, and said signals are acquired by said image processing apparatus as a digital image such that the computer estimates the position and orientation of the framed pallet relative to the telecamera, wherein the procedure comprises the following steps:

a) acquiring the estimated position and orientation of the pallet either by other sensors or by prior knowledge, so as to identify a region in which, when defined by a left cavity and a right cavity, will have a high probability of being the pallet to be framed;

b) on the basis of said prior estimate, framing by the telecamera of that region in which one of the sides of the pallet is assumed to be present;

c) transforming the image obtained by the telecamera into a digitized image in pixels, each pixel being assigned a grey value between the extreme values white and black;

d) determining within the image, and separately one from the other, two separate connected "dark" grey regions corresponding to the cavities which define the pallet;

e) estimating the position of the two centers of the two "dark" grey regions corresponding to the centers of the cavities of the previously known pallet model; and f) performing a perspective inversion on said model with respect to the optical center of the telecamera and computing with the data of said perspective inversion the position and orientation of the pallet relative to said telecamera; and wherein after said image is transformed into a pixel image, the two separate grey regions are determined by the following steps, each of which are implemented twice independently, once to seek the left cavity and once to seek the right cavity:

(i) estimating the positions of the center of the pallet cavities starting with the previous estimate of the pallet position and orientation;

ii) seeking the point of darkest grey, known as a kernel point, within a rectangle of determined dimensions centered on said two centers;

iii) constructing by means of an iterative growing procedure about said kernel points a connected region in which the pixels have a grey level less than a predetermined value;

iv iterating the growing procedure, each time increasing the threshold grey value by a given fixed quantity and verifying at each growing iteration that the degree of rectangularity of the determined region has not decreased, where said degree of rectangularity is expressed as the ratio of the area of the connected grey region to the area of the rectangle which contains it (circumscribed);

v) further verifying at each iteration that the dimensions of the region do not exceed the maximum dimensions determined on the basis of the previous estimate of the pallet position and orientation and the telecamera calibration;

vi) annulling the last iteration, if at least one of the verifications iv) and v) fails and, restoring the preceding region and updating, by reduction, the increase in the threshold grey level for subsequent iterations of the growing procedure; repeating the procedure starting with point iii), considering as kernel points all those at the edge of the restored region; and vii) halting the growing routine at the moment in which the increase in the threshold grey level cannot be further decreased without becoming equal to zero.

2. A system as claimed in claim 1, wherein said telecamera is a telecamera of black/white CCDS type generating a standard CCIR video signal.

3. A system as claimed in claim 1, wherein the movement of said fork prongs is controlled by said computer after processing the information regarding the pallet position and orientation relative to the telecamera.

\* \* \* \* \*